Jan. 5, 1937.   W. E. KERSHAW   2,066,939
SEPARATOR AND SPACER FOR STORAGE BATTERY PLATES
Filed July 25, 1933

WITNESS:

INVENTOR
William Ernest Kershaw
BY
Augustus B. Stoughton
ATTORNEY.

Patented Jan. 5, 1937

2,066,939

UNITED STATES PATENT OFFICE 2,066,939

SEPARATOR AND SPACER FOR STORAGE BATTERY PLATES

William Ernest Kershaw, Gwynedd Valley, Pa., assignor to The Electric Storage Battery Company, Philadelphia, Pa., a corporation of New Jersey Application July 25, 1933, Serial No. 682,052

1 Claim. (Cl. 136—143)

Separators and spacers for storage battery plates are usually designed with spaced parallel ribs over their surface between which ribs channels are provided to permit circulation of the electrolyte. In order to obtain maximum electrical conductivity, it is desirable to make the web of such separators as thin as possible and space the ribs relatively far apart. Designed in this way, the separators lack sufficient mechanical strength and rigidity for convenience in handling and assembly and to resist the pressure to which they may be subjected between adjacent plates under service conditions, especially at the edges and corners if there is any tendency for the plates to buckle.

It is the principal object of the present invention to impart to such separators the necessary or desirable rigidity which they lack.

Other objects of the invention will appear from the following description at the end of which the invention will be claimed.

Generally stated, the invention comprises a separator or spacer of flexible porous material deficient in rigidity and lying in substantially one flat plane and having inclined parallel facial ribs of substantially the same height and projecting from that plane, the ribs at opposite side margins where they overlie the frame of the plate being relatively closely spaced to impart rigidity, and the other ribs being relatively widely spaced to provide permeability between them at the active material of the plate.

The invention also comprises the improvements to be presently described and finally claimed.

Figure 1:
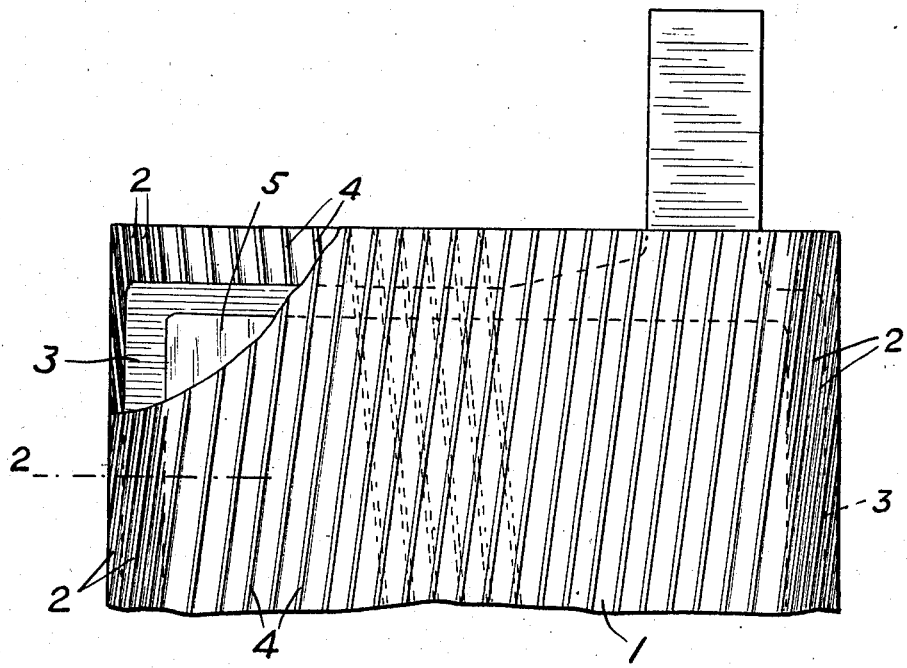
Figure 2:
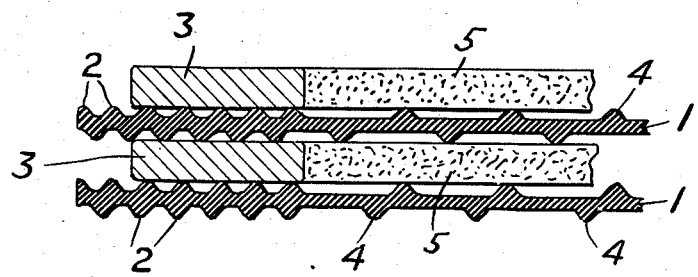

In the following description reference will be made to the accompanying drawing forming part hereof and in which Figure 1 is a face view with parts broken away showing closely spaced ribs over the frame of the plate and widely spaced ribs over the active portion of the plate, and Fig. 2 is a transverse sectional view drawn to an enlarged scale and taken on the line 2 of Fig. 1.

In the drawing 1 is a separator and spacer for a storage battery plate. The separator 1 consists of flexible porous or permeable material which is deficient in rigidity. The separator or spacer lies in substantially a flat plane and includes inclined facial ribs of substantially the same height, and they project from that plane. The groups of ribs 2 at opposite side margins, where they overlie the frame 3, of the plate, are relatively closely spaced, and impart the necessary rigidity, and the other ribs 4 are relatively widely spaced. The widely spaced ribs 4 overlie the active material 5 of the plate and therefore do not interfere with the permeability of the separator at that portion of it. The closely spaced ribs 2, of course, decrease the permeability of the separator, but since they overlie the frame 3 of the plate, which is inactive, that decrease in permeability is unimportant. It will be noted that the additional ribs are located where they are most effective in improving the rigidity of the separator along the edges and at the corners. The ribs on the opposite sides are inclined in opposite directions.

It will be obvious to those skilled in the art to which the invention relates that modifications may be made in details of construction and arrangement and matters of mere form without departing from the spirit of the invention which is not limited to such matters or otherwise than the prior art and the appended claim may require.

I claim:

An imperforate separator and spacer for storage battery plates consisting of a sheet of flexible porous material lying substantially in one flat plane and having inclined facial ribs projecting from that plane and whereof some are comparatively widely spaced and extend entirely across the sheet and whereof others are relatively short and are located intermediate those first mentioned and are confined to the opposite side margins of the sheet where they overlie the frame of the plate, all of said ribs being arranged in parallel relation.

WILLIAM ERNEST KERSHAW.